(12) United States Patent
Bailey et al.

(10) Patent No.: US 8,461,477 B2
(45) Date of Patent: Jun. 11, 2013

(54) METHOD FOR DETERMINING LASER SHOCK PEENING APPROACH ACCESSIBILITY

(75) Inventors: Mark Samuel Bailey, Cincinnati, OH (US); Michelle Bezdecny, Niskayuna, NY (US); Stefan Andreas Moser, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 930 days.

(21) Appl. No.: 12/543,678

(22) Filed: Aug. 19, 2009

(65) Prior Publication Data

US 2011/0042364 A1    Feb. 24, 2011

(51) Int. Cl.
*B23K 26/00*    (2006.01)

(52) U.S. Cl.
USPC ............... 219/121.6; 219/121.85; 219/128

(58) Field of Classification Search
USPC ................ 219/121.6, 121.85, 128
See application file for complete search history.

(56) References Cited

U.S. PATENT DOCUMENTS

| | | | |
|---|---|---|---|
| 5,531,570 A | 7/1996 | Mannava et al. | |
| 5,756,965 A | 5/1998 | Mannava | |
| 5,911,890 A | 6/1999 | Dulaney et al. | |
| 5,911,891 A | 6/1999 | Dulaney et al. | |
| 5,932,120 A | 8/1999 | Mannava et al. | |
| 6,570,125 B2 | 5/2003 | Suh et al. | |
| 7,109,436 B2 | 9/2006 | Even et al. | |
| 2001/0042738 A1* | 11/2001 | Dulaney | 219/121.77 |
| 2005/0045598 A1* | 3/2005 | Even et al. | 219/121.6 |
| 2005/0205529 A1* | 9/2005 | Claudet | 219/121.6 |

* cited by examiner

*Primary Examiner* — David Vu
*Assistant Examiner* — Brandon Fox
(74) *Attorney, Agent, or Firm* — John P. Darling (57) ABSTRACT

A method for determining accessibility of a tool to an object is provided. The method provides for selecting one or more sections on the object to be laser shock peened, selecting a region of interest on the one or more sections and determining a set of feasible solutions to access the selected region of interest on each of the one or more sections via use of an accessibility system. Systems and computer programs that afford functionality of the type defined by this method may be provided by the present technique.

21 Claims, 5 Drawing Sheets

FIG. 7

METHOD FOR DETERMINING LASER SHOCK PEENING APPROACH ACCESSIBILITY

BACKGROUND

Embodiments of the present invention relate generally to laser shock peening and more particularly to a method for determining all accessible angles to a region on an object that is to be laser shock peened.

Laser shock peening (LSP) is a surface treatment technique that is applied to improve fatigue performance of metallic components. Laser shock peening or laser shock processing, is a process for producing a region of deep compressive residual stresses on a surface area of an object. Typically, LSP uses one or more radiation pulses from high power pulsed lasers to produce an intense shock wave at the surface of the object. In other words, in LSP, a pulsed laser beam from a laser beam source is generally utilized to produce a strong localized compressive force on a portion of a surface of the object by impinging a laser beam on a point, the high energy laser beam produces a strong localized compressive force by an instantaneous ablation or vaporization of a thin layer of the surface or of a coating (such as tape or paint) on that surface.

As will be appreciated, laser shock peening requires access to a region on the object. The object may include a blisk for example. Also the blisk may be a single stage blisk or a multi-stage blisk. It may be desirable to access a region on a blade of the blisk. However, there are many obstacles that may interfere with access to the region on the blade that is to be laser shock peened. Unfortunately, the amount of energy in the laser beam may render the entire blisk unusable due to inaccessibility to the specified region on the blade. Further, an irregular geometry and clocking of blades in the blisk make it difficult to determine a feasible approach angle that also matches the physics requirement of the LSP.

Currently, commercial software solutions are available to plan a collision free path or to evaluate a path that has been developed earlier.

Unfortunately, these software solutions are not capable of handling multiple tools and/or 6+ axes. Furthermore, collision free paths can be evaluated through visual inspection only after a full path has been developed. More particularly, analysis for access is performed only after the path has been developed. This analysis requires an iterative, manual and laborious method to determine a solution for accessibility to the region of interest. Moreover, these software solutions do not allow for preplanning of accessibility for LSP and a choice of an optimal feasible solution. Several other software routines are available that facilitate determination of accessibility to a point or a set of objects from a specific angle. However, these approaches cannot be used with LSP, as LSP cannot work with a static approach angle.

It is therefore desirable to develop a method for determining all accessible angles to a region of interest in an object that is to be laser shock peened without developing a full path.

BRIEF DESCRIPTION

Briefly in accordance with aspects of the present technique a method for determining accessibility of a tool to an object is provided. The method provides for selecting one or more sections on the object to be laser shock peened, selecting a region of interest on the one or more section, and determining a set of feasible solutions to access the selected region of interest on each of the one or more sections via use of an accessibility system. Systems and computer programs that afford functionality of the type defined by this method may be provided by the present technique.

In accordance with another aspect of the present technique a method for determining accessibility of a tool to a blisk is provided. The method provides for selecting one or more blades on the blisk to be laser shock peened, wherein each of the one or more blades has a first face and a second face, selecting a region of interest on the first face of each of the one or more blades, identifying obstacles that interfere with access to the selected region of interest, obtaining tool information and granularity of investigation, determining a set of feasible solutions to access the selected region of interest on each of the one or more blades via use of an accessibility system and selecting an optimal solution from the set of feasible solutions. Systems and computer programs that afford functionality of the type defined by this method may be provided by the present technique.

In accordance with yet another aspect of the present technique a system for laser shock peening an object is provided. The system comprises a tool data repository for storing tool information, an accessibility system for determining accessibility of a tool to the object and a tool for generating a laser beam and directing the laser beam to a region of interest on the object based upon accessibility information provided by the accessibility system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present technique relate to methods for laser shock peening in an object, such as a single stage or a multi-stage blisk, and more particularly to a method for determining approach accessibility to a region of interest on a blade of a blisk that is to be laser shock peened. Although the embodiments of the present technique are described with reference to a blade on a blisk, it may be noted that the embodiments are applicable to other objects such as, a lone blade, a single blade on a blisk, or multiple blades on the blisk.

It may be noted that embodiments of the present technique may also find application in rotor blades including fan and turbine blades as well as in compressor blades.

Figure 1:
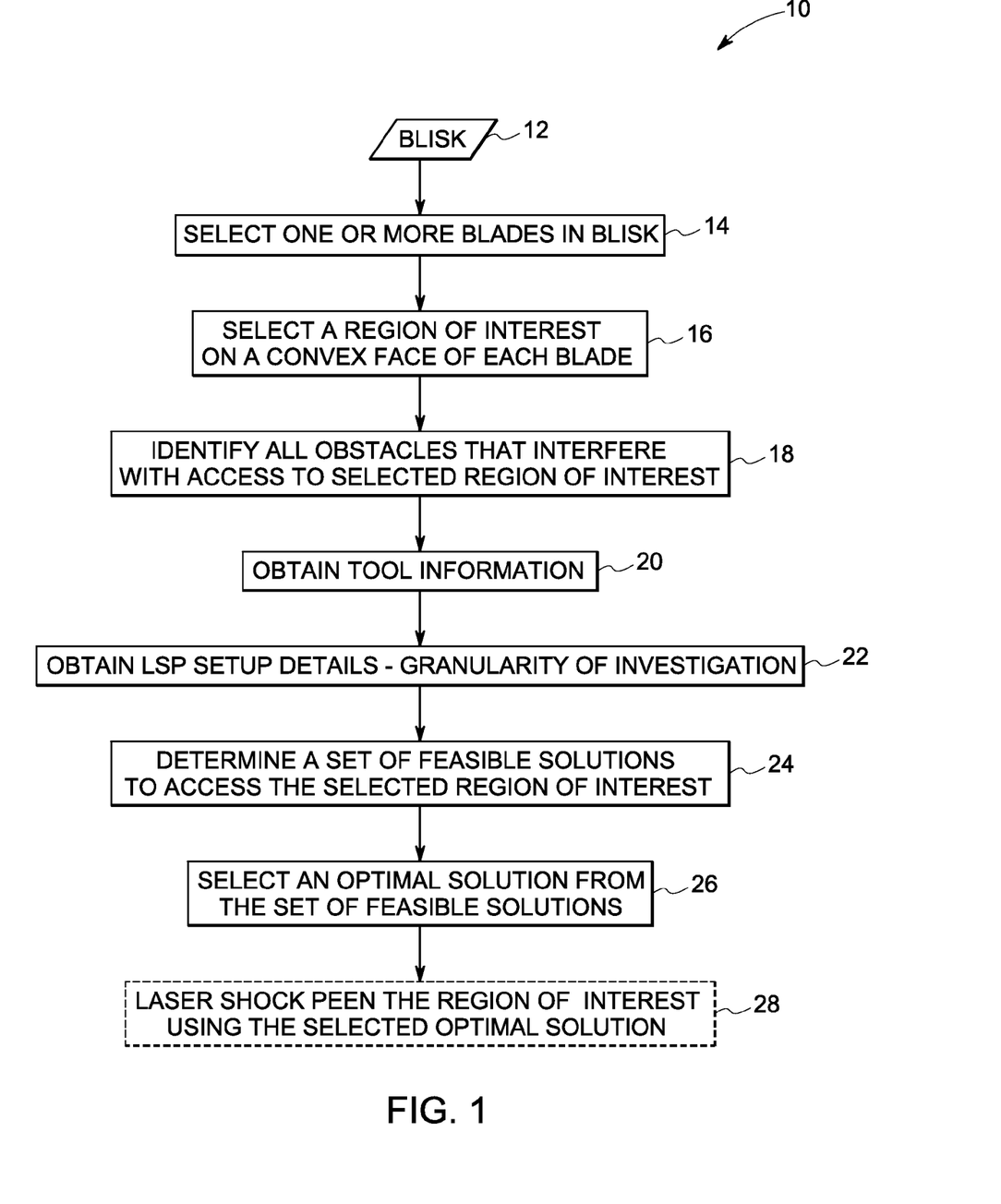
FIG. 1 is a flowchart depicting an exemplary method of determining laser shock peening approach accessibility, in accordance with aspects of the present technique.

FIG. 1 is a flowchart 10 illustrating an exemplary method for determining accessibility of a tool to an object. The object may include one or more sections that may require laser shock peening. The tool may include an LSP tool, for example. Also, the object may include a blisk for example. It may be noted that the method for determining accessibility of a tool to an object is described with reference to determination of accessibility of an LSP tool to a region of interest on a blade of a blisk. In accordance with exemplary aspects of the present technique, the method of determining accessibility of an LSP tool to a region of interest may be performed via use of a tool accessibility system. Reference numeral 12 is representative of an object such as a blisk, where the blisk 12 may require laser shock peening. The blisk 12 may be a single stage or a multi-stage blisk. As will be appreciated, the blisk is a single engine component that includes a rotor disc and blades. The blisk 12 may be formed by either machining a solid piece of material or alternatively, may be made by welding individual blades to the rotor disc.

Further, one or more blades on the blisk may also be selected, as indicated by step 14. It may be noted that all the blades on the blisk may also be selected. As will be appreciated, each blade on the blisk includes a first face and a second face. In one embodiment, the first face of the blade may be convex in shape while the second face of the blade may be concave in shape. Alternatively, the first face of the blade may be concave in shape and the second face of the blade may be convex in shape. In accordance with aspects of the present technique, a region of interest on the first face of each of the one or more blades is selected, as depicted by step 16.

As will be appreciated, accessibility to a blade and more particularly to a region of interest on the blade may be obstructed by a number of obstacles. Therefore, in accordance with aspects of the present technique, obstacles that may interfere with accessibility to the region of interest are identified, as indicated by step 18. The obstacles may include the blisk itself and other equipment in the setup of an exemplary system that may obstruct access to the region of interest on the first face or the second face of the blade.

Additionally, at step 20, tool information may be obtained. The tool information may include a diameter of the tool, an angle of convergence of the tool, and so forth. It may also be noted that the angle of convergence of a standard tool is zero whereas for the tool, such as a laser for example, the angle of convergence may be reflective of parameters such as intensity. Additionally, the tool information may include length of the tool, where the length of the tool is the distance of the tool from a focal point that may also affect width of the tool. In the present example, the tool may include a laser beam. Accordingly, at step 20, tool information such as, but not limited to, the diameter of the laser, the angle of convergence of the laser, and length of the laser may be obtained. In one embodiment, the tool information may be retrieved from a data repository for example.

Furthermore, at step 22, details of the LSP setup may be obtained. The details may also include a desired granularity of investigation of the region of interest on the blade. At step 24, a set of feasible solutions for accessing the selected region of interest in the blade may be determined. Further, in accordance with aspects of the present technique, an optimal solution from the set of feasible solutions may be selected as at step 26. Subsequently, the selected region of interest may be laser shock peened using the selected optimal solution, as indicated by step 28. The method of determining the feasible solutions of step 24 may be better understood with reference to FIG. 2.

Figure 2:
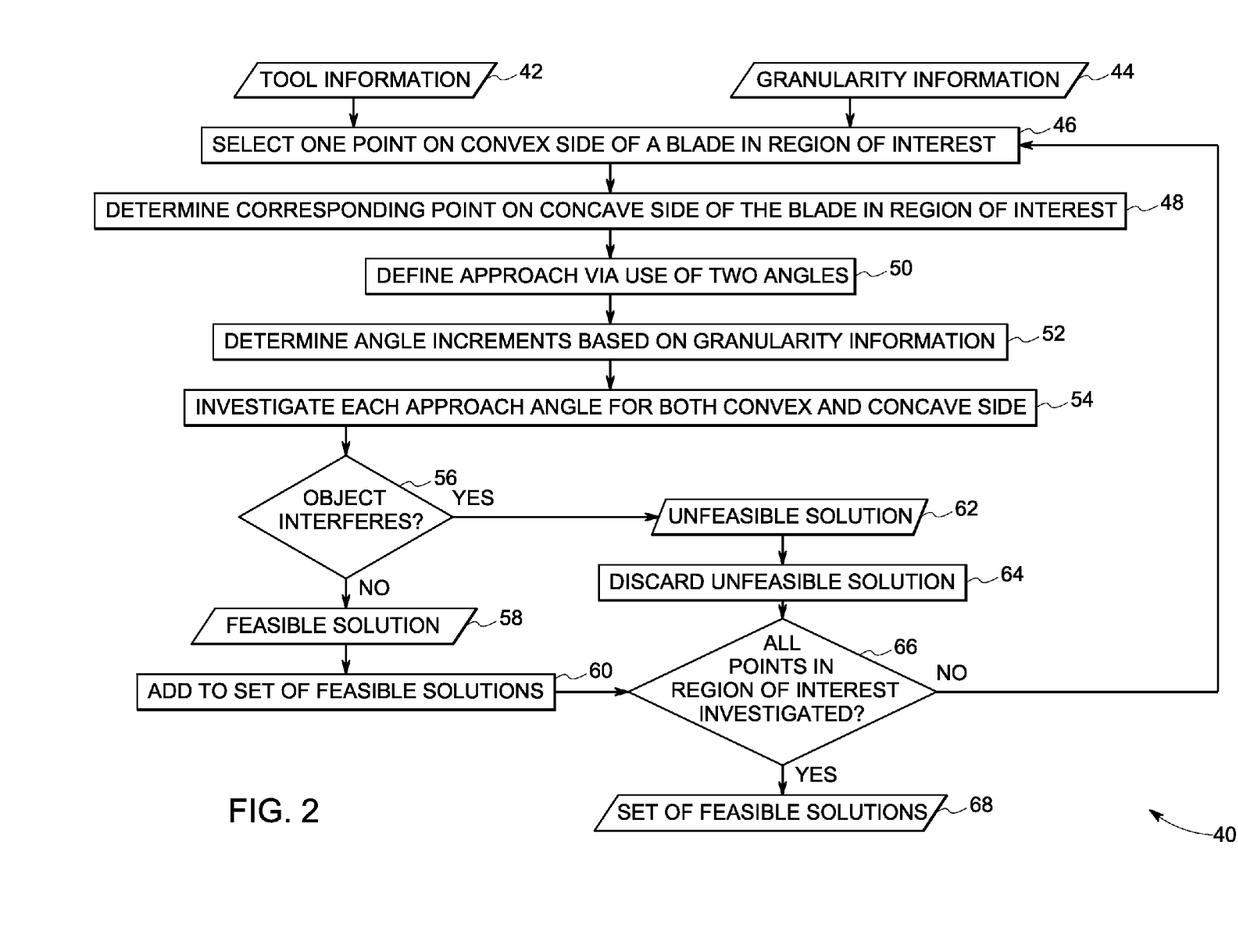
FIG. 2 is a flowchart depicting an exemplary method of determining a set of feasible solutions to access a region of interest in an object, in accordance with aspects of the present technique.

Referring now to FIG. 2, a flowchart 40 illustrating an exemplary method of determining feasible solutions to access a selected region of interest on a blade of a blisk is depicted. Tool information 42 and granularity information 44 serve as inputs to this method. The tool information 42 may be accessed from a tool data repository (not shown in FIG. 2), for example. It may be noted that in the present example, the tool is a laser. Accordingly, the tool information corresponding to the laser may include the diameter of the laser, the angle of convergence of the laser, and length of the laser. Also, information about granularity of investigation 44 may be obtained from an accessibility system. The method starts at step 46, wherein the region of interest on a convex face of the blade may be selected. A corresponding point on the concave face of the blade in the region of interest may be selected, as depicted by step 48.

Further, in accordance with aspects of the present technique, at step 50, an approach to access the selected point in the region of interest may be defined. In one embodiment, the approach may be defined via use of at least two angles. More particularly, the approach may be defined via use of an incident angle and an elevation angle to the selected point. Furthermore, as depicted by step 52, angular increments of a point may be determined. More particularly, the angular increments may be determined based on the granularity information 44. The angular increments are dependent on a number of factors such as, but not limited to, a spot size and a view window. The angle is determined to avoid processing of an infinite number of angles. Granularity for accessibility is determined that may in turn facilitate determination of a number of rays and angles to provide a desired granularity. The granularity is dependent on the diameter of the tool and a scale that may be specified by the user. In one embodiment, the granularity may be calculated using the equation:

$$p = \frac{\text{tool\_diameter}}{\text{scale}} \qquad (1)$$

where p is the granularity,
tool_diameter is the diameter of the tool, and
scale is a user defined input.
Also, the number of rays may be determined as $$\text{ray\_num} = \sqrt{4\pi R^2 / p} \qquad (2)$$

where ray_num is the number of rays, and
R is the radius of the tool.
The angular increments may be calculated using the equation:

$$\text{angle} = \frac{2\pi}{\text{ray\_num}} \qquad (3)$$

where angle is the angular increment.

Once, a plurality of approach angles are determined, each approach angle for both the convex and the concave sides of the blade may be investigated, as in step 54. More particularly, each approach angle may be investigated to determine if it is a feasible solution. As used herein, the term "feasible solution" is used to refer to an approach angle that provides an approach to the region of interest without any interference from any obstacle. Accordingly, at step 56 a check may be performed to see if an object interferes with the approach associated with the approach angle as indicated by step 56. However, at step 56, it is verified that if the object does not interfere with the approach the solution is a feasible solution 58. The feasible solution 58 may be added to a set of feasible solutions as indicated by step 60. On the alternative, if the object interferes with the approach then the solution is an unfeasible solution 62. Subsequently, the unfeasible solution is discarded, as depicted by step 64. Subsequently, at step 66, a check may be carried out to verify if all points in the region of interest are investigated. At step 66, if it is verified that all the points in the region of interest have been investigated, then it may be deduced that all feasible solutions have been determined. However, at step 66 if it is determined that all the points in the region of interest have not been investigated then steps 46 to 66 may be repeated. After all the points in the region of interest have been investigated, as at step 66, a set of feasible solutions is obtained, at step 68.

With returning reference to FIG. 1, in accordance with aspects of the present technique, an optimal solution may be selected from a list of feasible solutions 68 (see FIG. 2), as indicated by step 26. Furthermore, the optimal solution may be selected either manually or automatically by an exemplary accessibility system as described with reference to FIG. 7, to apply laser shock peening to the region of interest in the object.

Figure 3:
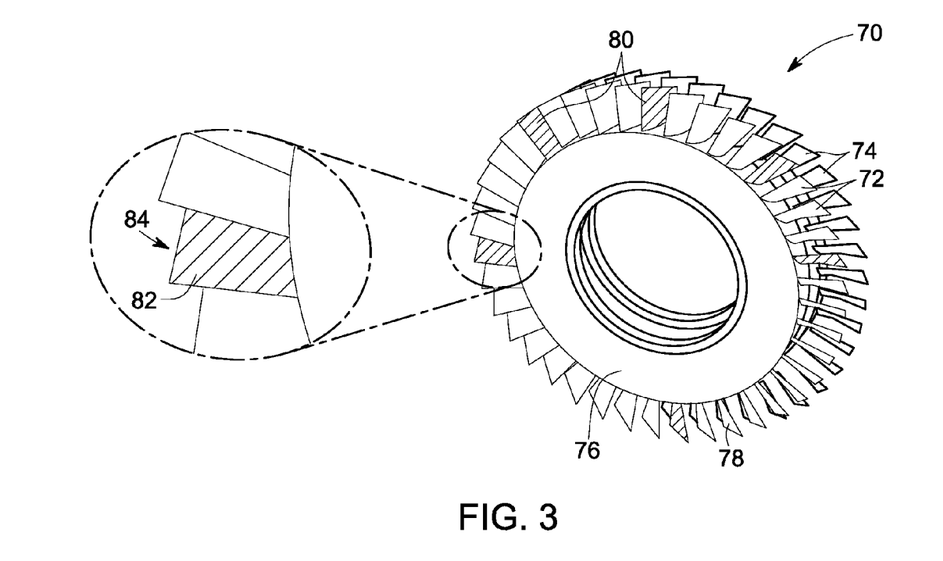
FIG. 3 is a diagrammatic illustration of a blisk including blades for laser shock peening, in accordance with aspects of the present technique.

The exemplary method described with reference to FIG. 1 and FIG. 2 may be better understood with reference to FIGS. 3-6. Referring now to FIG. 3, a diagrammatic illustration of a blisk 70 is presented. The blisk 70 is shown as having an axially spaced apart circumferential forward row 72 and an aft row 74. As will be appreciated, the blisk 70 is a single engine component that includes a rotor disc 76 and blades 78. The blisk 70 may be formed by machining a solid piece of material. Alternatively, the blisk 70 may be formed by welding individual blades 78 to the rotor disc 76. The circumferential forward row 72 of blades 78 in the blisk 70 may also be referred to as a first stage of the blisk 70 and the circumferential aft row 74 of blades 78 may be referred to as a second stage of the blisk 70. It may be noted that the blades 78 are representative of blades that extend radially outward from the blisk 70.

With continuing reference to FIG. 3, reference numeral 80 may be representative of a set of blades on the blisk 70 that require laser shock peening. In one embodiment, this set of blades 80 may be manually selected by a user or may be selected automatically by a computer. In accordance with aspects of the present technique, the blisk 70 may be mounted in a fixture (not shown in FIG. 3). The fixture may in turn be attached to a computer numerically controlled (CNC) manipulator that may be a part of laser shock peening apparatus. The CNC manipulator may move and position the set of blades 80 automatically, thereby facilitating in laser shock peening of the set of blades 80.

Furthermore, each selected blade 80 has a first side 82 and a second side 84. In one embodiment, the first side 82 of the blade may be convex in shape and the second side 84 may be concave in shape. Alternatively, the first side 82 of the blade may be concave in shape and the second side 84 may be convex in shape. Also, the first side 82 may be referred to as a first face and the second side 84 may be referred to as a second face of the blade 80.

Figure 4:
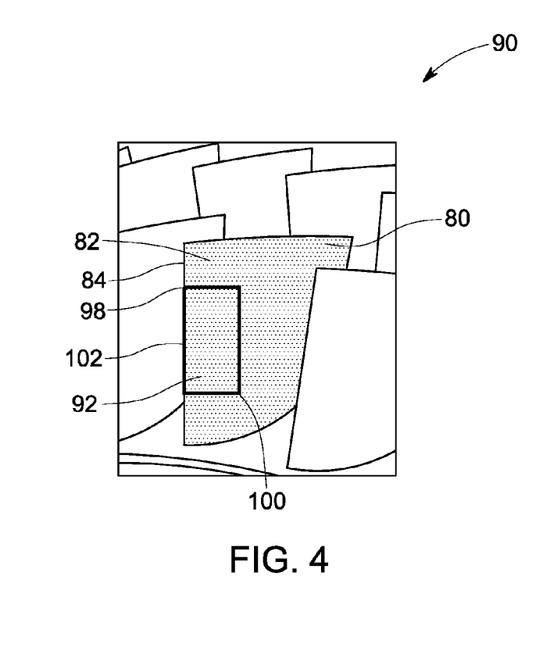
FIG. 4 is a blown-up view of a section of a blisk illustrating the blades, in accordance with aspects of the present technique.

Turning now to FIG. 4, a blown-up view of a section 90 of the blisk 70 (see FIG. 3) illustrating the blade 80 (see FIG. 3) is presented. More particularly, this section 90 may include a blade that requires LSP, such as the blade 80 of FIG. 3. Reference numeral 92 is representative of a region of interest on the first face 94 of the blade 80. The region of interest 92 includes a plurality of points for which LSP accessibility has to be determined. A reference point may be selected from the plurality of points in the region of interest 92. In the present embodiment, a reference point 98 located on the upper left corner of the region of interest 92 may be selected. The reference point 98 may be considered as origin of a reference co-ordinate system. The co-ordinate system may aid in specifying the co-ordinates of the plurality of points in the region of interest 92. Hence, with co-ordinates for each point specified, the accessibility of the tool, such as, but not limited to, a laser, to each point may be determined. Alternatively, a normal and a derivative of the point may be calculated to specify the co-ordinate system for the plurality of points in the region of interest 92.

As previously noted, it may be desirable to laser shock peen a region of interest on the blade 80. Accordingly, a region of interest 92 that may require laser shock peening may be identified. In the present embodiment, a bounded region 102 may demarcate the region of interest 92 on the first face 82 of the blade 80. Further, in the illustrated embodiment the bounded region 102 includes a rectangular region. However, the bounded region 102 may include regions of other shapes such as, but not limited to, a square, a triangle, a circle or a polygon, for example. The rectangular region 102 may determined by selecting an upper left corner point 98 of the bounded region 102 on the first face 82 and a lower right corner point 100 of the bounded region 102 on the first face 82 of the blade 80.

In accordance with further aspects of the present technique, once the region of interest 102 is selected, it may be desirable to determine accessibility to each point in the region of interest 102 accessibility to the region of interest 102 cannot be determined by a single point on the first face 82 or the second face 84 of the blade 80. The accessibility of a point may depend on several factors, such as, but not limited to, location of the point, geometry surrounding the point, obstacles in the view of that point and so forth. In accordance with aspects of the present technique, obstacles in the view of the point may include the blisk itself and other equipment in the setup that may obstruct the tool, such as, a laser, for example. Furthermore, in accordance with aspects of the present technique, granularity information is also obtained. More particularly, the granularity information may include information regarding a number of points for which accessibility information needs to be determined. In one embodiment, the number of points may be specified by a user or automatically by a system. Also, a grid may be formed based upon the number of specified points. Alternatively, the size of the grid may specify number of points that may be investigated.

Moreover, in accordance with aspects of the present technique, once the points on the first face 82 of the blade 80 are identified, corresponding points on the second face 84 of the blade 80 may also be identified. It may be noted that the corresponding points on the second face 84 may be identified based on physics of the laser shock peening process.

Figure 5:
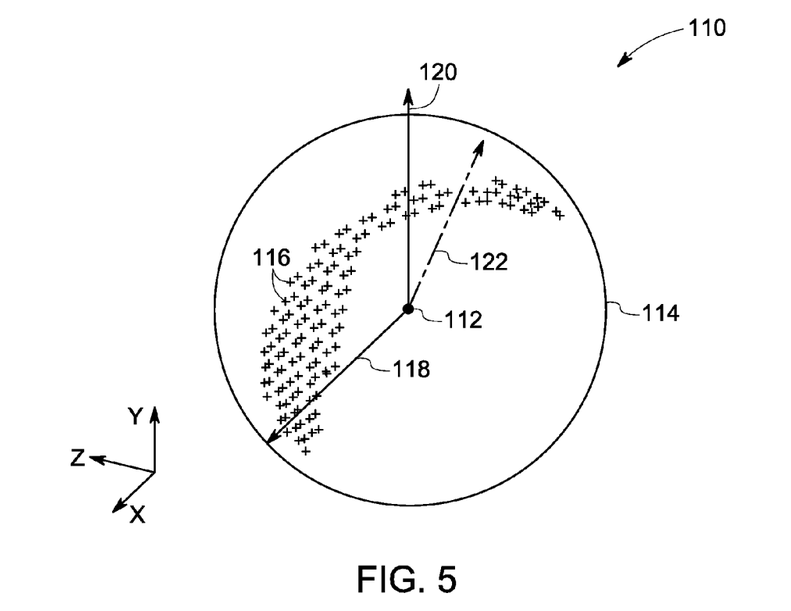
FIG. 5 is a diagrammatic illustration accessing a region of interest on a blade of a blisk using the feasible solutions, in accordance with aspects of the present technique.

Once the points of interest in the region of interest 102 are identified, it may be desirable to determine accessibility of the tool to each of these points of interest. FIG. 5 is a diagrammatic illustration 110 of an exemplary method of determining accessibility to the point of interest. More particularly, a diagrammatic illustration of a method of determining feasible solutions for accessibility of the points of interest in the region of interest 102 (see FIG. 4) on the first face 82 or the second face 84 of the blade 80 (See FIGS. 3-4) is depicted. Reference numeral 112 may be representative of a point of interest. In accordance with exemplary aspects of the present technique, in order to determine one or more feasible solutions of accessing the point of interest 112, a spherical region 114 may be formed around the point of interest 112. More particularly, the spherical region 114 may be formed such that the point of interest 112 is the center of the spherical region 114. As will be appreciated, the point of interest 112 may be accessed by a number of paths. Reference numeral 116 is illustrative of a number of feasible solutions or paths for a tool to access the point 112. In accordance with aspects of the present technique, accessibility to the point 112 may be dependent on several factors, such as, but not limited to, information about a tool. The information of the tool may include the diameter of the tool, the angle of convergence of the tool, and so forth. It may also be noted that the angle of convergence of a standard tool is zero. However, the angle of convergence for a tool, such as a laser for example, the angle of convergence may be reflective of parameters such as, intensity of the laser beam. Additionally, the tool information may include length of the tool, where the length of the tool is the distance of the tool from a focal point, which may also affect width of the tool. The distance of the tool may be used to determine adjustment of the view space based on radius of the tool.

With continuing reference to FIG. 5, the number of feasible solutions may be calculated based on equations (1), (2) and (3). Reference numerals 118, 120 are indicative of an X-direction and a Y-direction respectively. Reference numeral 122 may be representative of a user-selected direction from a set of feasible solutions 116 to approach the point of interest 112 on the face of the blade 80.

In accordance with aspects of the present technique, an approach to the point 112 on the face of the blade 80 may be defined by an incident angle and an elevation angle. The incident angle and the elevation angle may make up an entire sphere 114. In accordance with aspects of the present technique, if an object interferes with the accessibility at any given point for a set of angles, the set of angles may be discarded and feasible solutions such as feasible solutions 116 may be utilized. A user may select any of the determined feasible solutions 116 to approach the point of interest 112 on the face of the blade. The user selected feasible solution may be an optimal solution 122 to approach the point of interest 112 on the face of the blade.

Figure 6:
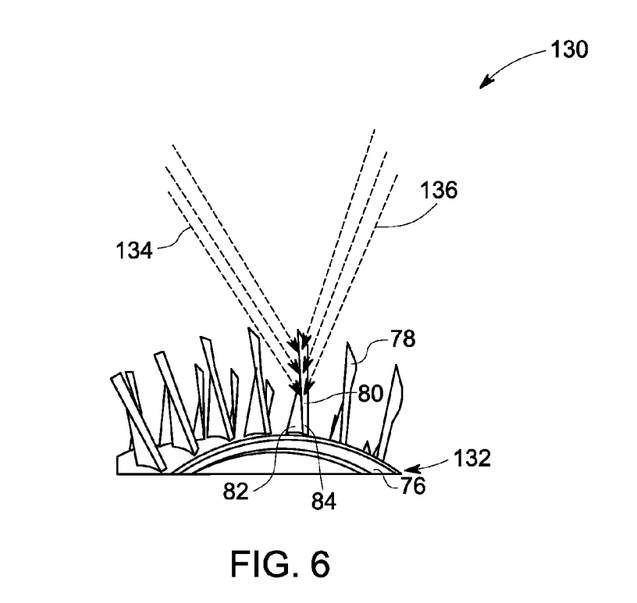
FIG. 6 is a sectional view of a portion of the exemplary blisk of FIG. 3 depicting laser shock peening, in accordance with aspects of the present technique.

Turning now to FIG. 6, a diagrammatical illustration 130 of an exemplary method of accessing a region of interest on a blade of a blisk using the feasible solutions 116 (see FIG. 5) is depicted. Reference numeral 132 is representative of a section of the blisk 70 (see FIG. 3). As previously noted with reference to FIG. 3, it may be desirable to laser shock peen a region of interest, such the as region of interest 102 (see FIG. 4) on the first face 82 and the second face 84 of the selected blade 80. Reference numeral 134, 136 are indicative of laser beams striking the first face 82 and the second face 84 of the blade 80 respectively. More particularly, the laser beams 134, 136 strike the first face 82 and the second face 84 of the blade 80 of the blisk 70 based on the feasible solutions 116 obtained in accordance with the exemplary method discussed hereinabove.

Figure 7:
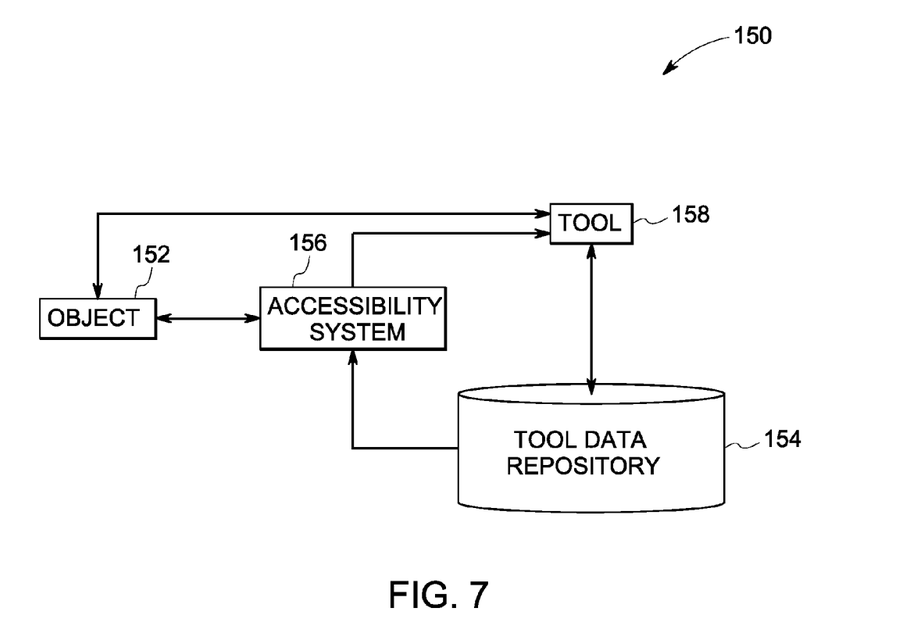
FIG. 7 is a block diagram of an exemplary laser shock peening system, in accordance with aspects of the present technique.

FIG. 7 is a block diagram of an exemplary laser shock peening system 150, in accordance with aspects of the present technique. More particularly, the laser shock peening system 150 includes an exemplary accessibility system 156 configured to determine one more feasible solutions to access a region of interest on an object 152. Although, the system 150 described herein is described in terms of a laser shock peening system, it may be noted that other systems such as, but not limited to, conventional milling, laser welding, laser cutting, water jet processing system and several deburring applications may also be used. Reference numeral 158 is representative of a tool, such as, but not limited to a laser. The exemplary system 150 includes a tool data repository 154 configured to store information about the tool. In accordance with aspects of the present technique, the tool data repository 154 may access information about the tool 158 directly from the tool 158. As previously noted, the tool information may include diameter of the tool at a point of contact of an object, angle of convergence of the tool, and so forth. Additionally, the tool information may include length of the tool.

Further, in accordance with aspects of the present technique, the exemplary system 150 includes the accessibility system 156 configured to determine the accessibility of a region of interest in an object 152 that may require laser shock peening, in accordance with aspects of the present technique. More particularly, the accessibility system 156 is configured to determine accessibility to the region of interest based upon the tool information and granularity of investigation. The granularity of investigation may be provided manually or may be automatically determined by the accessibility system 156. As previously noted, the granularity of investigation includes details of the object 152 such as physical and material properties of the object 152. The accessibility system 156 is configured to access tool information from the tool data repository 154. Additionally, the accessibility system 156 is configured to access details of the object 152. Furthermore, the accessibility system 156 communicates the granularity of investigation information corresponding to the object 152 to the tool 158 that may in turn generate a beam such as laser with desired intensity and direct the laser beam to target location for laser shock peening the object 152.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The method of laser shock peening approach accessibility as described hereinabove has several advantages such as, fast processing, quick response to design changes, optimizing approach angle and use in multi-stage blisk without the need for manual processing. Furthermore, the present technique as described hereinabove, allows preplanning of accessibility for LSP and a choice of an optimal solution from a set of feasible solutions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for determining accessibility of a tool to an object, the method comprising:
    selecting one or more sections on the object to be laser shock peened;
    selecting a region of interest on the one or more sections; and
    determining a set of feasible solutions to access the selected region of interest on each of the one or more sections, wherein determining the set of feasible solutions to access the selected region of interest on each of the one or more sections on the object comprises
        selecting a point in the region of interest on a first face of a section in the one or more sections; and
        defining an approach to the point in the region of interest via use of at least two angles.

2. The method of claim 1, wherein the tool comprises a laser.

3. The method of claim 2, further comprising acquiring tool information.

4. The method of claim 3, wherein acquiring tool information comprises at least one of obtaining a diameter of the tool at a point of contact on the object, an angle of convergence of the tool, or a length of the tool.

5. The method of claim 3, wherein the tool information comprises at least one of a diameter of the laser, an angle of convergence of the laser, or a length of the laser.

6. The method of claim 3, wherein acquiring tool information comprises acquiring tool information from a data repository.

7. The method of claim 1, further comprising obtaining a desired granularity of investigation for the selected region of interest.

8. The method of claim 7, wherein the tool is a laser and the method further comprises generating a beam of desired intensity based on the desired granularity of investigation.

9. The method of claim 7, further comprising determining angle increments based on the desired granularity of investigation.

10. The method of claim 9, wherein the angle increments are dependent on at least a spot size and a view window.

11. The method of claim 1, wherein determining the set of feasible solutions to access the selected region of interest on each of the one or more sections on the object further comprises:
    determining a corresponding point on a second face of the region of interest on the section; and
    investigating each approach angle for the point on the first face and the corresponding point on the second face of the section to determine a feasible solution.

12. The method of claim 11, wherein investigating each approach angle comprises:
    determining obstacles that interfere with access of the tool to the point in the selected region of interest; and
    identifying a feasible solution, an unfeasible solution or both based on the determined obstacles.

13. The method of claim 12, further comprising retaining the feasible solution to generate a set of feasible solutions and discarding the unfeasible solution.

14. The method of claim 13, further comprising selecting an optimal solution from the set of feasible solutions.

15. The method of claim 14, further comprising laser shock peening the selected region of interest using the optimal solution.

16. The method of claim 1, wherein the at least two angles comprise an incident angle and an elevation angle of the point on the section.

17. A method for determining accessibility of a tool to a blisk, the method comprising:
    selecting one or more blades on the blisk to be laser shock peened, wherein each of the one or more blades has a first face and a second face;
    selecting a region of interest on the first face of each of the one or more blades;
    identifying obstacles that interfere with access to the selected region of interest;
    obtaining tool information and granularity of investigation;
    determining a set of feasible solutions to access the selected region of interest on each of the one or more blades by
        selecting a point in the region of interest on the first face, and
        defining an approach to the point in the region of interest via use of at least two angles; and
    selecting an optimal solution from the set of feasible solutions.

18. The method of claim 17, wherein the region of interest comprises a plurality of points.

19. The method of claim 18, further comprising selecting a reference point from the plurality of points and developing a coordinate system.

20. The method of claim 17, further comprising laser shock peening the selected region of interest using the optimal solution.

21. The method of claim 17, wherein the first face on the one or more blades comprises a convex face and the second face comprises a concave face.

* * * * *